United States Patent [19]

Schwider et al.

[11] 3,979,530

[45] Sept. 7, 1976

[54] POLYESTER FIBER-VACUUM IMPREGNATED EPOXY RESIN INSULATION SYSTEM FOR HIGH VOLTAGE TRANSFORMERS

[75] Inventors: Alfred W. Schwider, Pacific Palisades; John Burnham, Los Angeles; Robert S. Buritz, Pacific Palisades, all of Calif.

[73] Assignee: Hughes Aircraft Company, Culver City, Calif.

[22] Filed: Apr. 15, 1974

[21] Appl. No.: 461,071

[52] U.S. Cl. .............................. 427/104; 427/203; 427/206; 264/102; 264/DIG. 54; 264/DIG. 75; 427/294; 252/64; 428/414; 428/480
[51] Int. Cl.² ....................................... H02K 15/12
[58] Field of Search ................... 252/65, 640, 63.2; 174/110 E, 110 SR, 127; 161/169, 170; 260/37 EP; 427/294, 296, 104, 203, 206

[56] References Cited

UNITED STATES PATENTS

| | | | |
|---|---|---|---|
| 2,893,061 | 7/1959 | Terry, Jr. | 264/85 |
| 2,912,382 | 11/1959 | Liao et al. | 427/294 |
| 3,649,402 | 3/1972 | Schwencke | 156/175 |

*Primary Examiner*—John D. Welsh
*Attorney, Agent, or Firm*—W. H. MacAllister; B. T. Hogan, Jr.

[57] ABSTRACT

A new insulation system, useful for the fabrication of high voltage transformers, capacitors and power supply encapsulation and insulation for high voltage leads, has been developed which substantially eliminates corona and improves reliability of these devices.

3 Claims, No Drawings

POLYESTER FIBER-VACUUM IMPREGNATED EPOXY RESIN INSULATION SYSTEM FOR HIGH VOLTAGE TRANSFORMERS

BACKGROUND OF THE INVENTION

1. Field of the invention

This invention is concerned with the preparation of a polyester filled epoxy resin electrical insulation system for use in lightweight high voltage transformers and capacitors.

2. Description of Prior Art

High voltage power supplies for satellite and other aerospace systems have previously been packaged either in oil or in a block of some hard or rubbery solid potting material. The oil-filled units were very reliable, but heavy due to the oil, case, and bellows unit. The potted units were heavy and larger than necessary since a great deal of the potting block was space empty of components. In addition, the potted units were less reliable than those filled with oil due to the lower electrical breakdown stress of the solid insulation. This lower breakdown stress has been attributed to defects or voids left by the potting process. In order to solve this problem, we have developed a lighter, more reliable solid encapsulation system which has a very high corona inception stress.

SUMMARY OF THE INVENTION

We have formulated a polyester-filled epoxyresin system which when cured acts as an excellent solid state insulation and encapsulation system. Our invention is the result of the synergistic effects of vacuum impregnating polyester fibers with an epoxy resin and hardener in a non-stoichiometric ratio and curing said system under high pessure. The uncured resin system exhibits a very low viscosity which facilitates vacuum impregnation and it must be cured under high pressure. When cured, this insulation is corona free in coils at up to 40 times conventionally used electrical stresses. This in turn means that transformer coils may be made much lighter and more reliable than before since less insulation is required for a given voltage.

DESCRIPTION OF THE INVENTION

Since 1890, high voltage transformers have been prepared using oil impregnated kraft paper for insulation. Low voltage transformers were insulated with wrappings of paper or potted with tar or some other rubbery material. Attempts to scale up the technology utilized in the manufacture of low voltage transformers to high voltage transformers have failed. The failure was caused by the presence of voids throughout the insulation which break down in the high electric fields thereby degrading the insulation and causing an eventual short circuit. Conventional, state-of-the-art transformers operate at less than 100 volts/mil stress without breaking down.

We have formulated a hardener comprised of menthane diamine, metaphenylene diamine and benzyldimelthylamine (HV) which, when added to Epon 815, a Shell Oil Co. product comprised of 11% butyl glycidyl ether and 89% Epon 828 resin* having an epoxide equivalent of 175 to 195 and a viscosity of 5 to 7 in non-stoichiometric ratio, forms a low viscosity resin system that can be used to fill voids and impregnate fillers prior to being cured to an essentially void free structure.

*Epon 828 resin is a reaction product of bisphenol-A and epichlorohydrin, with the following general structural formula:

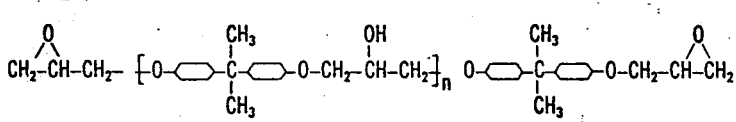

At 25°C, Epon 828 has a viscosity of 100 to 160 poises, and an epoxide equivalent of 180 to 195.

This resin system, when added to a porous barrier comprised of polymat insulation fibers, completes our high voltage system. The fibers are chopped polyester materials, 1 micron in diameter and several centimeters in length. They are pressed together in a binderless felt or mat which exhibits approximately 50% porosity. Polyester fibers of this description were selected because their coefficient of linear expansion and Young's modulus are such as to allow them to follow closely the expansion of the cured epoxy resin. Other fibers may be used, but the fibers may pull away from the resin during expansion caused by exposure to high temperature, thereby creating voids within the structure.

The system is formed by vacuum impregnating the hot resin into the fibrous mat, degassing, pressurizing to approximately 500 psi for a cure at 70°–80°C and post-curing at elevated temperatures under atmospheric pressure.

PREFERRED EMBODIMENTS

We have fabricated power transformers insulated with our system wherein the resin was comprised of the following materials by weight:

| Resin Formulation | |
|---|---|
| Epon 815 | 100 parts by weight |
| HV Hardener | 16 parts by weight | wherein the HV hardener is comprised of:

| | |
|---|---|
| Methane diamine | 250 parts by weight, |
| Metaphenylene diamine | 100 parts by weight, and |
| Benzyldimethylamine | 1.5 parts by weight. |

This ratio of hardener to Epon 815 is nonstoichiometric and tends to lower the uncured viscosity of the Epon 815 which facilitates complete impregnation of the fibrous mat. The coils to be impregnated are made using the fibrous polyester mat as interwinding and intrawinding insulation and as a wrapper. The vacuum-pressure impregnation process is:

1. Vacuum bake units for 16 hours minimum at 100°–110°C (at 2mm of Hg)
2. Bleed back dry air or nitrogen into vacuum oven, remove parts from oven.
3. Immediately place parts to be impregnated into a suitable impregnation container such as a slush mold and place container onto a hot plate which has been placed inside of a vacuum chamber and is operating at 90°–110°C. In the top of the chamber place a separatory funnel having a tube extending into the impregnation container. Seal the chamber and quickly evacuate.

4. Maintain chamber pressure at 30 mHg or less and the hot plate at 90°–110°C.
5. Thirty minutes after the start of the evacuation, weigh out 500 grams of Epon 815 into glass or plastic beaker and place in oven operating at 70°–80°C. Heat resin for 20 minutes.
6. Remove resin from oven and degas for 10 minutes at a pressure of 700 $\mu$Hg or less.
7. Return resin to 70°–80°C oven and rewarm for 10 minutes. Begin warming separatory funnel to 70°–80°C.
8. Remove resin from oven and add 80 grams of HV hardener (Hughes Aircraft Co.) and thoroughly mix for 2 minutes.
9. Degas resin mixture at a pressure of 700 $\mu$Hg or less for 10 minutes.
10. Carefully pour mixture into separatory funnel which is at a temperature of 70°–80°C. Introduce the mixture into the vacuum chamber until all parts are completely covered by resin. Complete the introduction in 3–5 minutes.
11. Continue pumping for 10 to 15 minutes or until the pressure returns to 200 $\mu$Hg or less.
12. Return parts to atmospheric pressure and immediately place in a pressure pot and pressurize to at least 500 psig with dry nitrogen.
13. Begin heating parts to 70°–80°C. Maintain temperature for 16 hours minimum.
14. Return parts to atmospheric pressure and cure at 125°–130°C for 4 hours minimum.
15. Cool parts and carefully remove excess resin from around parts. Remove core plug.

It should be noted that the nonstoichiometric proportion of hardener tends to dilute the uncured resin thereby allowing easy penetration of the resin into the porous barrier material. Epon 815 concentrations of 100 ± 10 parts by weight (pbw) with HV concentrations of 16 ± 2 (pbw) have been shown to exhibit the desired characteristics. The porous barrier impregnates very easily and acts both as a spacer and a wick.

Non-stoichiometric hardener-resin ratios of other systems may be used. The key appears to be in the balance between lowering the viscosity of the system to facilitate complete wetting of the fibers and maintaining sufficient crosslinking to render the structural strength required.

Prior processes have utilized both vacuum casting techniques and pressure curing. However, our process utilizes a much harder vacuum (30 $\mu$) than state of the art processes (a few millimeters) and cure pressures much higher (500 psig) than state of the art processes (less than 100 psig).

Electrical insulation systems prepared via this process have been used in the fabrication of solid dielectric transformers which have no corona at very high electrical stresses (500–2000 v/mil). The use of porous barrier materials facilitates the fabrication of entire transformer coils — primary and secondary — as a monolithic unit at a great saving in time and tooling costs. Until this time it has been impossible to make resins with corona inception stresses within an order of magnitude of what we have achieved.

Considering the above disclosure and the current state of the art relative to the insulation of solid state electrical components, the nature and scope of our invention as described below will be understood.

What is claimed is:

1. A process for making a polyester-filled epoxy resin electrical insulation system comprised of epoxy-impregnated chopped polyester fibers which includes the steps of applying a porous fiber mat to an electrical device to be insulated, vacuum baking said fibers at 100 to 110°C for at least 16 hours and then placing said device into a suitable impregnation container heated to 90° to 110°C, wherein said impregnation chamber is evacuated to a pressure of 30 $\mu$Hg or less, said epoxy resin is heated to 75° ± 5°C and degassed at a pressure of 700 $\mu$Hg or less prior to addition of a nonstoichiometric hardener, comprised of a mixture of menthane diamine, metaphenylene diamine, and benzyldimethylamine, said hardener is added to said resin at 75 ± 5°C mixed thoroughly and degassed thereby forming a curable resin system, said resin system is introduced into said impregnation chamber whereby all fibers to be impregnated are completely covered by said resin system, said impregnated fibers are removed from said 2. A process for making an electrical insulation system composed of a porous barrier material and a curable resin comprising the steps of
   a. applying said porous barrier material to an electrical device and prebaking said material at an elevated temperature of from 100° to 110°C for a period of not less than 16 hours at a reduced atmospheric pressure,
   b. maintaining said elevated temperature while evacuating a chamber contaning said material to a pressure of less than 30 microns of mercury,
   c. introducing a hot degassed resin premix into said chamber until said baked material is completely submerged in said resin, thereby causing said porous material to be impregnated with said resin,
   d. pressurizing said impregnated material with dry nitrogen to at least 500 psi and maintaining said material at this pressure and at a temperature of from 70° to 80°C for a period not less than 16 hours, and
   e. returning said material to ambient pressures to cure said material at a temperature of from 125° to 130°C prior to allowing said material to cool.

3. The process of claim 2 where said resin is a reaction product of bisphenol-A and epichlorohydrin cured with a hardener comprised of menthane diamine, metaphenylene diamine, and benzyldimethylamine in a nonstoichiometric ratio.

* * * * *

UNITED STATES PATENT OFFICE
CERTIFICATE OF CORRECTION

PATENT NO. : 3,979,530
DATED : September 7, 1976
INVENTOR(S) : ALFRED W. SCHWIDER ET AL It is certified that error appears in the above-identified patent and that said Letters Patent are hereby corrected as shown below:

Column 2, line 1, "viscosity of 5 to 7" should read --viscosity of 5 to 7 poises,--.

Column 2, the structure shown in lines 50-55, "Methane" should read --Menthane--.

Column 4, line 31, after "from said" should read --impregnation chamber, placed in a pressure pot and pressurized to at least 500 psig with dry nitrogen for a 16-hour precure at 75 $\pm$ 5°C, and said pressure pot is subsequently returned to atmospheric pressure where the temperature is increased to 127.5 $\pm$ 2.5°C for a 4-hour post cure of said impregnated fibers prior to being allowed to cool for final processing as required to physically trim the insulated electrical system.--.

Signed and Sealed this

Fourth Day of January 1977

[SEAL]

Attest:

RUTH C. MASON
*Attesting Officer*

C. MARSHALL DANN
*Commissioner of Patents and Trademarks*